D. T. SANFORD.
Ornamenting Metal Tubes.
No. 60,067.
Patented Nov. 27, 1866.
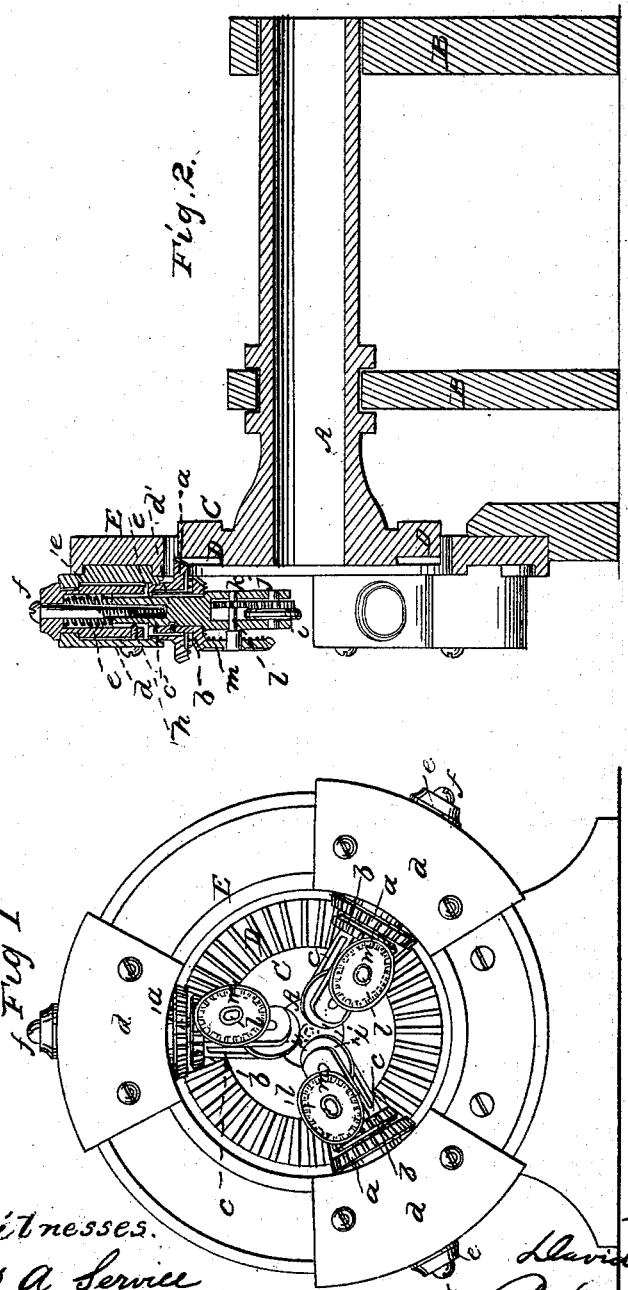

United States Patent Office.

IMPROVEMENTS IN MACHINERY FOR EMBOSSING BRASS TUBES.

D. T. SANFORD, OF NEW YORK, N. Y.

Letters Patent No. 60,067, dated November 27, 1866.

SPECIFICATION.

TO ALL WHOM IT MAY CONCERN:

Be it known that I, DAVID T. SANFORD, of the city, county, and State of New York, have invented a new and improved Machine for Embossing Brass Tubes, etc.; and I do hereby declare that the following is a full, clear, and exact description thereof, which will enable others skilled in the art to make and use the same, reference being had to the accompanying drawings, forming part of this specification, in which—

Figure 1 represents a front elevation of this invention.

Figure 2 is a longitudinal vertical section of the same.

Figure 3 is a side elevation of a tube or other round article embossed by my machines.

Similar letters of reference indicate like parts.

This invention relates to a machine which is intended to emboss cylindrical pipes or rods of wood, metal, or any other suitable material, the operation of embossing being effected by three or more revolving wheels or knurls, which are mounted on pins in the forked ends of shafts that radiate from the centre of a hollow spindle, and which are so arranged that they can be adjusted towards and from the centre. On the hollow spindle is mounted a master-wheel, which gears in cog-wheels mounted on the radiating shafts in such a manner that by imparting a revolving motion to the hollow spindle the desired revolving motion is imparted to the knurls, and the article to be embossed is drawn in by the revolving motion of said knurls; and by changing the position of the knurls different designs can be produced.

A represents a hollow spindle, which has its bearings in a head, B, similar to the head of a turning-lathe. On the end of this spindle is mounted a face-plate, C, to which is secured a large cog-wheel, D. Said cog-wheel gears in a series of wheels or pinions, $a$, which are bored out to fit on the hubs of bevel-wheels, $b$, being connected to the same by feather keys, so that they can move thereon in a longitudinal direction, or in a direction parallel to their axis, independent of said bevel-wheels; but if a revolving motion is imparted to the pinions, $a$, the bevel-wheels, $b$, are compelled to revolve with them. The bevel-wheels, $b$, revolve freely on shafts $c$, but they are prevented from moving on them in a longitudinal direction by screws or keys, $c'$, catching in annular grooves $d'$, and the shafts $c$ radiate from the centre of the hollow spindle, A; and they are fitted into thimbles, $e$, that have their bearings in boxes $d$, and are secured to a ring, E, which rises from the bed of the head B, and which surrounds the face-plate, C. The thimbles, $e$, are clamped tightly in the boxes, $d$, but by relieving the screws which hold the caps of said boxes in position the thimbles, together with the shafts, can be turned and adjusted in the proper position, as will be presently explained. The shafts are secured in their thimbles by screws $f$, and springs $g$ have a tendency to force said shafts in towards the centre of the hollow spindle, A, and by the combined action of the screws $f$ and springs $g$ the shafts can be adjusted at the desired distance from said centre. A screw or key, $h$, which catches in a longitudinal groove in each of the shafts prevents the same from turning in the thimbles. The springs, $g$, also render the shaft $c$ yielding, whereby injury to the machine and to the article to be embossed is prevented, as will be presently explained. The inner ends of the shaft $c$ are bifurcated, and they straddle the embossing-wheels or knurls, $i$. These knurls have their bearings on steel pins secured in the forked ends of the shafts $c$, and to their sides are attached small cog-wheels, $j$, which gear in corresponding cog-wheels, $k$, mounted on shafts, $l$, the outer ends of which bear bevel-wheels, $m$, that gear in the bevel-wheels, $b$. By means of these cog-wheels a direct revolving motion is imparted to the knurls, and if the same are adjusted in the proper position they will draw in the article to be embossed and at the same time produce on its circumference the desired marks or designs. By relieving the caps of the boxes, $d$, and turning the thimbles $e$ and shafts $c$, the angle of the knurls towards the axis of the hollow spindle or that of the article to be embossed can be varied at pleasure, and lines or ornaments of different nature can be produced with the same knurls. The axles of the knurls are so arranged that the same can be readily taken out and knurls of a different nature can be introduced This machine is of particular value for ornamenting gas pipe. It is not liable to overstrain or twist off the pipe which is drawn into the machine by the action of the knurls; and said knurls being secured to yielding shafts are not liable to crush in the pipe. My machine may, however, be used for the purpose of embossing cylindrical articles of any description whatever, provided the material from which said articles are made will admit the action of the knurls.

What I claim as new, and desire to secure by Letters Patent, is—

1. The arrangement of a series of knurls to which a positive revolving motion is imparted in combination with a hollow spindle, A, constructed and operating substantially as and for the purpose described.

2. Making the knurls yielding in a radial direction by springs $g$, substantially as and for the purpose set forth.

3. The thimbles $e$ and boxes E, in combination with the shafts $c$, the ends of which form the bearings for the knurls, substantially as described, so that said knurls can be adjusted at any desired angle towards the axis of the articles to be embossed without throwing them out of gear with the driving mechanism.

D. T. SANFORD.

Witnesses:
    WM. F. McNAMARA,
    ALEX. F. ROBERTS.